United States Patent Office 3,379,544
Patented Apr. 23, 1968

3,379,544
REFRACTORY BONDING MORTAR
Richard O. Burhans, 17 Curry Hollow Road, Pittsburgh, Pa. 15236, and George H. Criss, 5939 Monogahela Ave., Bethel Park, Pa. 15102
No Drawing. Filed Mar. 7, 1966, Ser. No. 532,103
5 Claims. (Cl. 106—55)

ABSTRACT OF THE DISCLOSURE

An air setting, substantially dry, particulate mortar mixture consisting essentially of 2 to 12% of liquid phosphoric acid having a $P_2O_5$ content calculated as $H_3PO_4$ in excess of 100% and the balance at least one material selected from the group consisting of high alumina materials analyzing at least about 50% $Al_2O_3$, clay and zircon sands.

---

The requirements which a bonding mortar must meet in service are frequently extremely exacting and demand a carefully adjusted balance of properties. For economy and convenience, a mortar should have good working properties when mixed to either putty-like or cream-like consistency. With excellent workability and water retention over a range of consistencies, a mortar can be used for dipper or trowelled joints. The mortar should not shrink excessively upon drying or heating and should have a good working time and have both cold and hot bonding properties. The thermal expansion of the mortar should be substantially the same as that of brick with which it is used or temperature variations will affect the bond between brick and mortar causing surface cracking and peeling. The refractoriness must be high enough that the mortar will not melt or flow from joints under furnace operating conditions.

Refractory mortars may be divided into two general classes; namely, heat setting bonding mortars and air setting bonding mortars. The distinguishing feature of a heat setting bonding mortar is that it requires relatively high temperatures for the development of an adequate bond, commonly called the ceramic bond. The bond generally begins to develop between 2000° F. and 2500° F., depending upon its composition. For many purposes, heat setting bonding mortars do not meet the needle of modern furnace practice. At moderate temperatures, a heat setting bounding mortars do not meet the needs of brick, although the flexibility of such a structure is sometimes valued.

Air setting mortars take a relatively strong set upon drying, have a firm bond at elevated temperatures, and form mechanically strong joints with high resistance to abrasion and erosion. Bonding mortars of the air setting type are now used for laying many types of standard refractory brick, especially in those portions of a furnace where the operating conditions are most severe. Air setting mortars are recommended for service where a strong bond is desired over a wide range of temperatures. Chemical binders are used to impart air setting properties and to maintain the strength of the bond up to the temperature at which a ceramic bond takes effect.

More common air setting mortars are bonded with an alkaline silicate. These mortars are strong and exhibit excellent workability. However, it has been found that the alkaline silicate bonds reacts quite rapidly with some molten metals, resulting in deep joint penetration. Commercial experience has shown this penetration to be deeper than through the refractory brick joined by the mortar. Similar experience has been had with other prior art mortars.

In the United States Patent No. 3,179,526, filed Mar. 5, 1962, and owned by the assignee of the present invention, mortar compositions are disclosed and claimed, composed of, by weight, 15–25% of orthophosphoric acid of 75% concentration with the remainder being at least one member selected from the group consisting of high alumina materials and zircon. These mortars are characterized by good strength and resistance to penetration by molten metals. They are generally prepared by mixing the refractory with the phosphoric acid and water. They are "wet" and therefore must be carefully packaged for shipment to the job site.

Packaging of mortar in a wet state has been found to be somewhat undesirable since the phosphoric acid tends to react with the other mix ingredients after lengthy periods of storage before use. This reaction in storage later causes difficulties in applying the mortar to the refractory brick at the job site. Another problem sometimes encountered has been that the mortar, in the wet state, tended to stiffen when exposed to the cold weather encountered during winter months.

In accordance with the present invention, it has been discovered that partially molecularly dehydrated phosphoric acid, (i.e., phosphoric acid in which the ratio of $P_2O_5$ to $H_2O$ exceeds that of $H_3PO_4$, so that the $P_2O_5$ content, calculated as $H_3PO_4$, exceeds 100%), when mixed in prescribed proportions with a nonbasic refractory material gives physical properties superior to mortars containing wet phosphoric acid (i.e., 75–85% concentration). Alternatively, the phosphoric acid employed may be characterized as having a $P_2O_5$ content greater than about 72.4%. When we refer to the phosphoric acid as having a concentration in excess of 100%, we mean that the $P_2O_5$ content is greater than that of $H_3PO_4$ and the water content is less. More specifically, 105% phosphoric acid means that the $P_2O_5$ content corresponding to 105% calculated as $H_3PO_4$. All of the water contained therein is chemically combined as contrasted with free water present in lesser concentration acids. Thus, the acid used in this invention will freeze at lower temperatures. A most surprising and unexpected aspect of the present invention is that superior properties are obtained where the $P_2O_5$ content of the mix (with the addition of phosphoric acid having a concentration in excess of 100%) is less than the required $P_2O_5$ content of the mix with the addition of wet phosphoric acid.

The mortar batches of the present invention in a broad embodiment contain, from about 2 to 12%, by weight, of partially molecularly dehydrated phosphoric acid. It is to be noted that the phosphoric acid content of these mortars exceeds the quantity that would be needed for bonding purposes alone. The excess acid functions in some unknown manner to inhibit attack on the mortar composition, and no conclusive theory to explain this action has been formulated to date. In a preferred embodiment, the mortar batches contain about 4 to 8% of 105% phosphoric acid.

In the past, any refractory mix containing liquid phosphoric acid was considered a "wet" mix. In mixes containing 100%+ phosphoric acid, certain of the particles in the mix have liquid between them as a thin film, but the films are surrounded by sufficient fine particles that a cluster of particles has a dry appearance. There is a minimal tendency of these particles to react or stiffen in storage as compared to wet mixes. Accordingly, since the mortars of the invention are not truly "wet" mortars, we refer to them as "substantially dry" mortars.

The other major constituent of the mortar compositions of the invention is a nonbasic refractory material, such as high alumina materials, clay and zircon. Zircon is derived, for example, from certain beach sands and is a well known article of commerce. Generally, zircon averages over 95% by weight of $ZrO_2$ plus $SiO_2$ and the reminder is composed of alumina, titania, iron oxide, calcium oxide, magnesium oxide, and like naturally occurring constituents. Among the suitable clays are crude and calcined siliceous clays, such as ball clays, bentonite, etc., calcined rough flint clays and calcined and crude kaolins. Representative high alumina materials which may be used include calcined or uncalcined bauxite, alumina, diaspore, and minerals of the kyanite-sillimanite group. The alumina materials for purposes of this invention have an analysis of at least about 50%, by weight, $Al_2O_3$ and preferably at least 60% thereof. The analyses of preferred materials used in the invention are, in weight percent, typically as follows:

TABLE I

|  | Calcined South American Bauxite, percent | Crude Alabama Bauxite, percent | Ball Clay, percent | Zircon, percent | Calcined Rough Flint, percent | Bentonite, percent | Crude Kaolin, percent | Calcined Kaolin, percent |
| --- | --- | --- | --- | --- | --- | --- | --- | --- |
| $SiO_2$ | 6.2 | 15.5 | 54.0 | 32.3 | 48.4 | 61.7 | 44.8 | 52.0 |
| $Al_2O_3$ | 89.0 | 54.6 | 30.1 | 1.0 | 46.8 | 21.5 | 38.7 | 44.9 |
| $TiO_2$ | 3.1 | 1.9 | 1.7 | 0.2 | 2.4 | 0.1 | 1.4 | 1.6 |
| $Fe_2O_3$ | 1.5 | 0.8 | 1.0 | 0.2 | 1.1 | 3.8 | 1.1 | 1.3 |
| CaO |  | 0.1 | 0.2 | 0.16 | 0.2 | 1.2 | 0.1 | 0.1 |
| MgO |  | Trace | 0.3 | 0.04 | 0.4 | 2.6 | 0.1 | 0.1 |
| Alkalies | 0.2 | 0.1 | 0.4 |  | 0.7 | 0.3 | 0.3 | 0.3 |
| Ignition Loss |  | 27.2 | 12.3 |  |  | 6.1 | 13.9 |  |
| $ZrO_2$ |  |  |  | 66.1 |  |  |  |  |

TABLE II

| Mix | 1 | 2 | 3 |
| --- | --- | --- | --- |
| Calc. S.A. Bauxite, −35 mesh (percent) | 9 | 8 | 8 |
| Calc. S.A. Bauxite, BMF | 70 | 69 | 65 |
| Crude Kaolin, BMF | 10 | 9 | 9 |
| Calc. Kaolin, −35 mesh | 5 | 5 | 4 |
| Starch | 2 | 2 | 2 |
| 105% Phosphoric Acid | 4 | 7 | 12 |
| Plasticity Tests: |  |  |  |
| a. Water added to bring to trowelling consistency, (percent) | 18 | 16 | 15 |
| b. Water retention test—time during which mortar retains enough water to maintain a shiny surface on a silica brick (seconds) |  | 300+ |  |
| c. Spreading Test—time during which mortar may be worked on a silica brick (seconds) |  | 300+ |  |
| d. Adherence to silica brick |  | Good |  |
| 2,910° F. Cup Joint Slag Test—Open Hearth Finish Slag, Depth of Penetration, Inches | 1.1 | 1.0 | 1.1 |

The mortar, according to the concepts of this invention, has utility with various available refractories utilized in the lining of furnaces. An example of refractory shapes with which mortar, according to this invention, might be used are those made of materials such as zircon, chrome, fireclay, high alumina, and the like.

The mortar batches may be prepared in accordance with practices not standard in the industry. The refractory constituents are ground to a size such that essentially all will pass a 28 mesh Tyler screen. Still additional and finer grinding improves the smoothness of spreading.

It is preferred that the constituents be ground so that about 25 to 40% is −35+150 mesh and about 60 to 75% is −150 mesh (Tyler). The constituents are blended with phosphoric acid in a manner to coat the acid droplets with fine particles. A few percent (i.e., up to 2%) of starch or other plasticizing agents may be added.

A preferred method for preparing a substantially dry, particulate mortar composition consisting of refractory material and phosphoric acid is as follows: The refractory constituents are size graded as above. A portion (about 2 to 5%) of the fine fraction of crude refractory material is mixed with a portion (about 25 to 50%) of the acid. The acid is applied to the material in a fine spray so as to enable coating of individual droplets of acid with fine refractory. The remainder of the fine fraction and the coarse fraction of refractory is then blended into the mixture. The remainder of the acid is added to the batch in a fine stream while mixing. Alternatively, if desired, to insure complete coating of the droplets with fine refractory, only a portion (about 15 to 30%) of the coarse fraction may be added with the remainder of the fines. The balance of the coarse material may then be added subsequently. The substantially dry batch is mixed with water for use.

The invention is described further in conjunction with the following examples, details of which are given by way of illustration and not by way of limitation.

Each of the batches shown in Table II below was prepared by mixing dry refractory constituents, and phosphoric acid in sequential steps in a commercial type mixer. The chemical analysis of the refractory materials used are those given in Table I above. The batches were trowelled on silica brick for various plasticity tests. After drying, certain of the mortar surfaces were tested for depth of penetration by basic open hearth slag.

Results of tests on the above mixes shown in Table II indicate that the mixes containing 105% phosphoric acid have relatively good plasticity and resistance to penetration by slag.

In another experiment the batches shown in Table III were prepared to show the superiority of mortars prepared according to the present invention as compared with a similar mortar using 85% phosphoric acid. Mixes 5 and 6 were prepared by prereacting a portion of the phosphoric acid with a portion of the fine fraction of refractory according to the preferred method set forth above. Mix 4 was not prereacted.

TABLE III

| Mix | 4 | 5 | 6 |
| --- | --- | --- | --- |
| Calcined South American Bauxite, −35 mesh (percent) |  | 95 |  |
| Crude Alabama Bauxite, BMF |  | 3 |  |
| Bentonite |  | 2 |  |
| 85% Phosphoric Acid | 15.9 |  |  |
| 105% Phosphoric Acid |  | 12.6 |  |
| 115% Phosphoric Acid |  |  | 11.4 |
| $P_2O_5$ Content, percent | 9.9 | 9.9 | 9.5 |
| Plasticity Tests: |  |  |  |
| a. Water added to bring to trowelling consistency (percent) | 10.0 | 15.5 | 18.5 |
| b. Water retention test—time during which mortar retains enough water to maintain a shiny surface on a silica brick (seconds) |  | 300+ |  |
| c. Spreading test—time during which mortar may be worked on a silica brick (seconds) | 60 | 300+ | 150 |
| d. Adherence to silica brick | Poor | Fair | Fair |
| Modulus of rupture, p.s.i.: After drying at 250° F | 690 | 880 | 770 |

The results above show that the mortars of the invention have greater plasticity and strength at a lower or equivalent $P_2O_5$ content using the preferred method of preparation.

The following is what we consider to be the best mode for practicing the present invention. A mix shown in Table IV was prepared as follows:

The crude kaolin was separately mixed while a portion of the 8%, 105% concentration phosphoric acid was blended therewith in a fine stream to coat droplets of the acid. The calcined rough flint, starch and a portion of the bauxite were then added. The remainder of the acid was blended with the batch in a fine stream and finally the balance of the bauxite was added. The overall sizing of the batch was about 65 to 70% −150 mesh with the balance being substantially −35 +150 mesh (Tyler).

TABLE IV

Mix: Y percent
- Calcined South American bauxite, −35 mesh -- 80
- Calcined rough flint, −65 mesh -- 5
- Crude kaolin, −65 mesh -- 5
- Starch -- 2
- 105% phosphoric acid -- 8

Plasticity Tests:
- (a) Water added to bring to trowelling consistency, percent -- 16.8
- (b) Water retention test—time during which mortar retains enough water to maintain a shiny surface on a silica brick (seconds) -- 300+
- (c) Spreading test—time during which mortar may be worked on a silica brick (seconds) -- 300+
- (d) Adherence to silica brick -- Good Bonding Test:
- Cold set joints—modulus of rupture, p.s.i. after drying at 250° F. -- 600
- 2910° F. cup joint slag test, 50 grams open hearth slag, depth of penetration, inches -- 1.1

The results above show the mortar to have relatively good plasticity and strength after drying and good resistance to slag penetration.

A typical chemical analysis of the slag employed in the slag penetration tests of the examples is shown below:

| | Percent |
|---|---|
| Silica ($SiO_2$) | 13.5 |
| Alumina ($Al_2O_3$) | 1.5 |
| Titania ($TiO_2$) | 0.8 |
| Iron oxide ($Fe_2O_3$) | 28.5 |
| Chromic oxide ($Cr_2O_3$) | 1.0 |
| Lime (CaO) | 35.3 |
| Magnesia (MgO) | 11.8 |
| Manganese (Mn) | 6.1 |
| Phosphorus (P) | 2.5 |

In the above examples, the 2910° F. Cup Joint Slag test was performed as follows: A high alumina shape having a centrally located depression measuring approximately 3 inches in diameter and one inch in depth was sectioned across the depression. The two pieces were bonded together using the mortar of the invention and then dried. Fifty grams of open hearth slag in granular form were placed in the depression covering the mortared joint. The shape containing the slag was heated to 2910° F. After heating, the shape was broken along the mortared joint and the depth of penetration of the slag in the mortar was measured.

While the invention has been described with reference to particular embodiments and examples, it should be understood that modifications, substitutions and the like may be made therein without departing from its scope.

Having thus described the invention in detail and with sufficient particularity as to enable those skilled in the art to practice it, what is desired to have protected by Letters Patent is set forth in the following claims.

We claim:

1. In a method for preparing an air setting, substantially dry, particulate mortar consisting of non-basic refractory material and about 2 to 12%, by weight, liquid phosphoric acid having a $P_2O_5$ content, calculated as $H_3PO_4$ in excess of 100%, the steps comprising size grading the refractory so that about 25 to 40% is −35+150 mesh and from 60 to 75% is −150 mesh, mixing a portion of the fine fraction of crude material with a portion of the acid to provide a coating of fines over individual droplets of acid, blending the remainder of the fine fraction and the coarse fraction with the mixture and adding the remainder of the acid to the batch while mixing.

2. The method of claim 1 in which the amount of phosphoric acid is between about 4 and 8%, by weight.

3. The method of claim 1 in which the $P_2O_5$ content of the phosphoric acid calculated as $H_3PO_4$ is 105%.

4. The method of claim 1 in which said fine fraction portion is about 2 to 5%, of the total.

5. The method of claim 1 in which said acid portion is about 25 to 50%, of the total.

References Cited

UNITED STATES PATENTS 3,298,839  1/1967  Troell -- 106—65

TOBIAS E. LEVOW, *Primary Examiner.*

JAMES E. POER, *Examiner.*